(12) United States Patent
Kirkbride et al.

(10) Patent No.: US 10,479,472 B2
(45) Date of Patent: Nov. 19, 2019

(54) COVER PANEL FOR AIRCRAFT LANDING GEAR WHEEL WELL

(71) Applicant: The Boeing Company, Chicago, IL (US)

(72) Inventors: David W. Kirkbride, Allyn, WA (US); Jerald C. Baillie, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 15/611,425

(22) Filed: Jun. 1, 2017

(65) Prior Publication Data

US 2018/0346089 A1 Dec. 6, 2018

(51) Int. Cl.
| | |
|---|---|
| *B64C 25/12* | (2006.01) |
| *B64C 25/16* | (2006.01) |
| *B64C 1/14* | (2006.01) |
| *B64C 25/34* | (2006.01) |

(52) U.S. Cl.
CPC ............... *B64C 1/14* (2013.01); *B64C 25/12* (2013.01); *B64C 25/16* (2013.01); *B64C 25/34* (2013.01); *B64C 2025/125* (2013.01)

(58) Field of Classification Search
CPC ........... B64D 1/06; B64C 25/12; B64C 25/14; B64C 25/16; B64C 1/1438; B64C 1/1466; B64C 1/14
See application file for complete search history.

(56) References Cited

U.S. PATENT DOCUMENTS

| 6,663,047 B1 | 12/2003 | Arata | |
|---|---|---|---|
| 2016/0039517 A1* | 2/2016 | Peltier | B64C 25/14 244/129.5 |
| 2016/0325816 A1* | 11/2016 | Scimone | B64C 1/1407 |

FOREIGN PATENT DOCUMENTS

DE 729222 C 12/1942

OTHER PUBLICATIONS

Search Report for related European Application No. 18175254.4; dated Jul. 16, 2018.

* cited by examiner

*Primary Examiner* — Philip J Bonzell
*Assistant Examiner* — Tye William Abell
(74) *Attorney, Agent, or Firm* — Miller, Matthias & Hull LLP

(57) ABSTRACT

An aerodynamic cover panel for a landing gear wheel well in an undercarriage of an aircraft includes at least one embodiment having a peripheral lip that defines a plane. Movements of the cover panel to open and close the wheel well are confined to pivotal rotation within the plane, and occur within an aerodynamic boundary layer of the undercarriage about a pivot axis in one rotational direction to open the wheel well, and in an opposite rotational direction to close the wheel well. The cover panel includes a flange, to which a rotary shaft is secured at one end for rotation about the pivot axis. The other end of the rotary shaft is secured to an actuator fixed within the undercarriage. In one embodiment, the cover panel rotates about an arc of at least 75° between fully opened and fully closed positions of the wheel well.

20 Claims, 4 Drawing Sheets

COVER PANEL FOR AIRCRAFT LANDING GEAR WHEEL WELL

FIELD

The present disclosure generally relates to aircraft structures for covering and/or closing landing gear wheel wells of aircraft, and more specifically to designs of cover panels configured to remain within an aircraft undercarriage boundary layer, whether open or closed, to substantially minimize aerodynamic drag loads.

BACKGROUND

Commercial aircraft landing gear have traditionally included doors that open and close wheel wells within the undercarriage of the aircraft. Typically the doors move along axes situated parallel to the forward-aft axis of the fuselage of the aircraft in order to achieve their deployed (open) and retracted (closed) positions. Because the doors have substantial width and depth, such positioning, particularly while deploying and/or when opened, places them well outside of a typical boundary layer area associated with the aircraft undercarriage. As a result, the doors may create substantial and undesirable drag loads during slower flight, such as when the aircraft is being configured and positioned for landing.

Thus, there may be opportunities for landing gear door designs that more effectively reduce aerodynamic drag and interior cabin noise during flight. In addition, there remains a continuing need for reduction of physical weights of landing gear doors, as well as of associated actuator mechanisms that open and close such doors. Reductions in weight and drag can generate efficiencies that promote increased range and payloads of aircraft, as well as reductions in operating fuel costs.

SUMMARY

In accordance with one form of the present disclosure, a landing gear door is rotatably secured to an aircraft undercarriage adjacent a wheel well. The landing gear door is formed as a lightweight, thin cover panel that defines a plane oriented generally parallel to the aircraft undercarriage. The cover panel is configured to close and open the landing gear wheel well via rotation within the plane.

In accordance with another form of the present disclosure, a cover door retrofit kit is provided for an aircraft undercarriage having a wheel well. The cover door is configured to open and close the wheel well by pivotal rotation within a plane parallel to the undercarriage. The cover door retrofit kit includes a generally planar wheel well cover and rotary shaft configured to be secured to the wheel well cover at an orthogonal angle with respect to an edge portion of the wheel well cover. The cover door retrofit kit further includes an actuator motor configured to pivot the rotary shaft relative to the undercarriage for moving the wheel well cover within a plane defined by the wheel well cover. In this manner, the cover can remain parallel to the undercarriage while moving to and away from the wheel well, the rotary shaft being configured to rotate the cover door between open and closed positions.

In accordance with yet another form of the present disclosure, a method of closing a landing gear wheel well includes configuring a cover door for attachment to the undercarriage of an aircraft, adjacent a wheel well of the aircraft. The method includes securing a rotary shaft to the cover door and to an actuator motor fixed to the undercarriage by securing a first end of the rotary shaft to the actuator motor, and attaching a second end of the rotary shaft to a flanged edge of the cover door. The method further includes configuring the cover door to pivot within a plane defined by the cover door so the cover door is confined to movement parallel to the undercarriage, and rotating the cover door by moving the rotary shaft to pivot the cover door about an arc within the plane to open and close the wheel well.

The features, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined in the appended claims.

Figure 1:
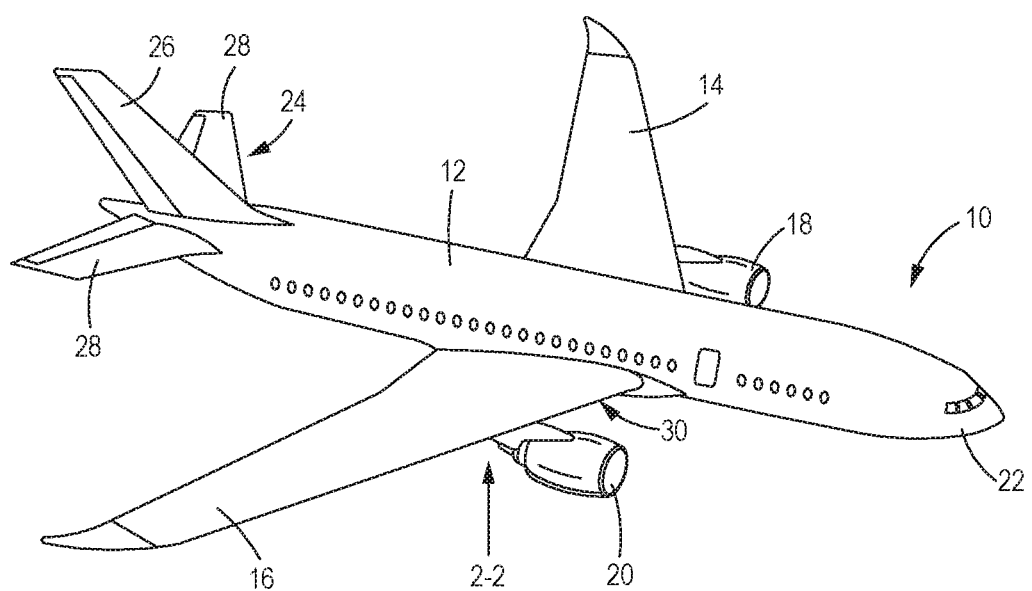
FIG. 1 is a perspective schematic view of an aircraft in flight, the aircraft of a type that may include a pair of main landing gear wheel well cover doors (hidden in this view) constructed in accordance with the present disclosure.

Referring initially to FIG. 1, an aircraft 10 is shown in flight. The aircraft 10 includes a main body or fuselage 12, and a pair of wings including a left wing 14 and a right wing 16, each wing extending laterally, or outwardly of the fuselage 12. A left engine 18 and a right engine 20 is supported from each of the left and right wings 14, 16, respectively. The aircraft 10 includes a nose 22, and an empennage 24 that includes a vertical stabilizer 26 and left and right horizontal stabilizers 28, as will be appreciated by those skilled in the art.

Figure 2:
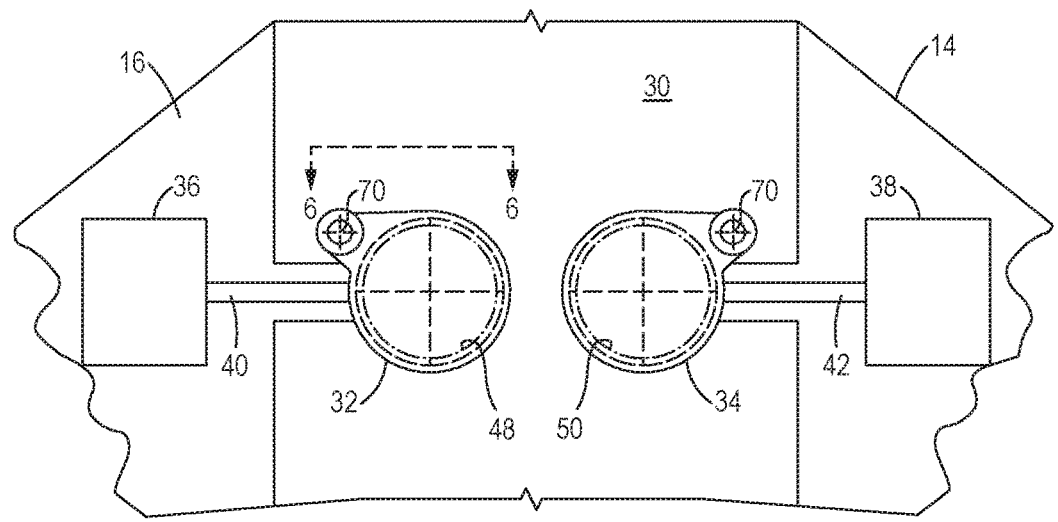
FIG. 2 is a schematic view of a portion of the undercarriage of the aircraft of FIG. 1, viewed along lines 2-2 of FIG. 1, depicting the referenced pair of main landing gear wheel well cover doors in a closed position.

Referring to FIG. 2, a portion of an undercarriage 30 of the aircraft 10 of FIG. 1 includes a pair of landing gear doors 32, 34. The landing gear doors 32, 34 (variously referred to herein as "cover panels" or "cover doors") are configured to cover retracted main landing gear wheels 44, 46 (FIG. 3), that are normally retracted (or stowed) within main landing gear wheel wells 48 and 50 (best viewed in FIG. 3) for minimizing drag forces while in flight (FIGS. 1 and 2). Each pair of landing gear wheels 44, 46 are shown on axles supported on main landing gear struts 40, 42, which are in turn supported on respective trunnions 36, 38. The trunnions 36, 38 not only support weight of the aircraft 10, including even increased aircraft landing loads, but also enable reliable deployment and retraction of the landing gear structures described.

Figure 3:
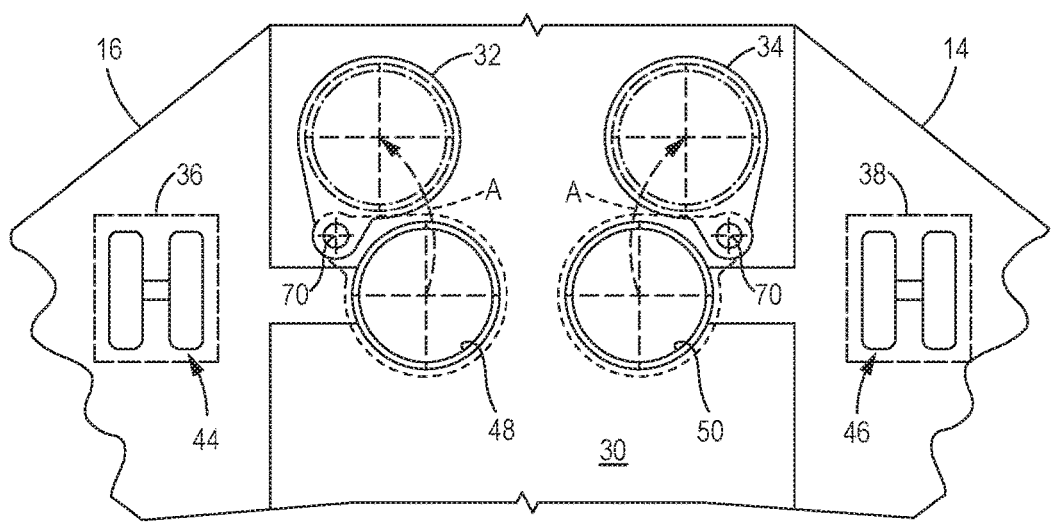
FIG. 3 is a schematic view of a similar portion of the undercarriage, but depicting the wheel well cover doors in an open position.

Referring to FIG. 3, the landing gear doors 32, 34 are shown to have rotated within a plane parallel to the undercarriage 30 to open or uncover the wheel wells 48, 50, as would be done in preparation for deployment of the main landing gear structures for landing of the aircraft 10, for example. In the view of FIG. 3, the wheels 44, 46 are shown in a deployed state for landing. For purposes of the rotation process, the cover panels 32, 34 are secured to the undercarriage 30 at a pivot axis 70, for movement within the referenced plane, as will be further described. In various embodiments, the cover panels may rotate away from the wheel wells in an aft direction, instead of the forward direction depicted. In addition, the amounts of rotation may vary; for example, in the described configuration, the cover panel may rotate in an arc A of least 75° between fully opened and fully closed positions of the wheel well. In other configurations, the arc A may vary from 60° to 90° or even from 30° to 180°, depending on size and geometry of the undercarriage surfaces surrounding the wheel wells, as well as other aircraft design factors. Of course, in no event would it be desirable that the cover panel pivot away from the wheel well so far as to extend physically outwardly of the undercarriage. In such case, the cover panel would no longer be within an aerodynamic boundary layer of the undercarriage.

Figure 4:
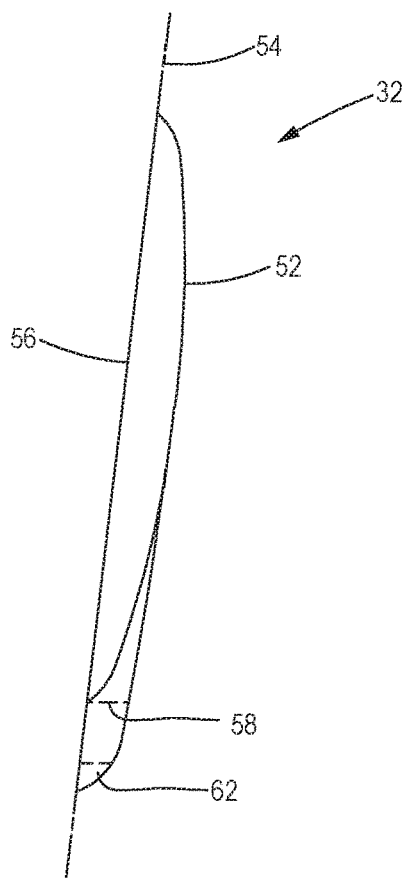
FIG. 4 is a side view of one embodiment of the cover door of the present disclosure.

Referring to FIG. 4, one of the cover panels, cover panel 32 is shown in greater detail. For brevity, only one cover panel will be described herein, since the cover panel 34 is reversely identical to cover panel 32. The cover panel 32 is essentially an airfoil, constructed in the form of a Frisbee toy-styled circular disc that includes an aerodynamic convex exterior surface 52 and a peripheral lip 56. In the circular form of the cover panel 32, as shown and described herein, the lip 56 defines a plane 54 of the cover panel 32 in which the cover panel rotates about the pivot axis 70 between open and closed positions of the wheel well 48. Although none are presented herein, other shapes, including noncircular, may be utilized in alternate constructions of the cover panel 32.

Figure 5:
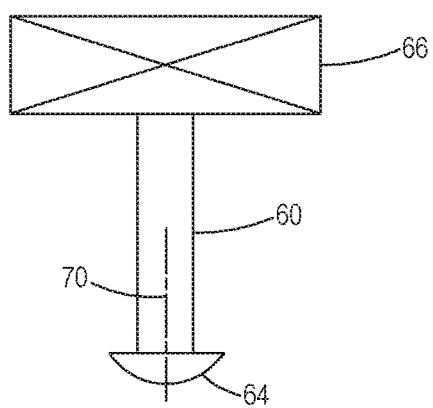
FIG. 5 is a schematic view of an actuator motor and rotary shaft mechanism that may be employed with the embodiment of the cover door of FIG. 4.

An edge boundary of the otherwise circular cover panel 32 is defined by a flange 62 which includes an aperture 58 for receiving a rotary shaft 60 (FIG. 5). In the embodiment of FIG. 4, the flange is formed integrally with the cover panel, and both may be formed of a lightweight composite material, such as a carbon fiber or other lightweight composite material.

Referring to FIG. 5, the rotary shaft 60 is configured to extend from an actuator motor 66, fixedly contained within the undercarriage 30. The rotary shaft 60 has a head 64 adapted to be rigidly fixed to the flange 62 of the cover panel 32 to support rotation of the latter about the pivot axis 70.

Figure 6:
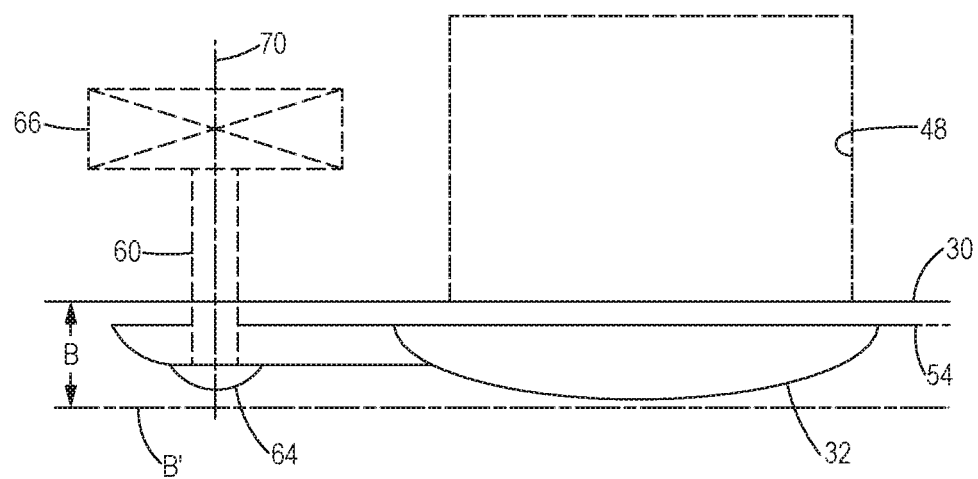
FIG. 6 is a schematic view of the components of FIGS. 4 and 5 installed on an aircraft undercarriage, depicting an operational cover door within an aerodynamic boundary layer of the undercarriage.

Referring to FIG. 6, a portion of the undercarriage 30 containing the wheel well 48 includes the cover panel 32, shown in place physically over the wheel well 48, as during flight when the main landing gear wheels 44 would normally be stowed within the wheel well 48 under the cover panel 32. The actuator motor 66 is also shown situated in place to selectively rotate the rotary shaft 60. As will be appreciated by those skilled in the art, the head 64 of the rotary shaft 60 can be configured to effectively secure the cover panel flange 62 for imparting rotary motion to the cover panel 32 relative to the wheel well 48. The actuator motor 66 may then enable the rotary shaft 60 to pivot about the pivot axis 70 for opening and closing of the cover panel 32.

In the described embodiment, all movements of the cover panel 32 are entirely contained within an associated boundary layer "B" of the undercarriage 30; actual thickness of the boundary layer B is the distance between an extremity B' of the boundary layer B and the undercarriage 30. In some configurations of flight, the undercarriage boundary layer thickness B can be approximately three (3) inches, for example. Generally, the undercarriage comprises a generally planar surface surrounding the wheel well openings, and the plane 54 of the cover panel will be substantially parallel to the planar surface defined by the undercarriage 30. Limiting all movements of the cover panel 32 to be within the boundary layer of the aircraft undercarriage can assure minimal drag, as the cover panel 32 never extends outside of the boundary layer B, as do conventional landing gear doors, during landing gear deployment and retraction operations.

Although the described embodiment restricts all movements of the cover door 32 to a single plane 54, this disclosure may be broadened to allow for limited axial or orthogonal movement of the cover door relative to the undercarriage. For example, it may be desirable that the cover panel 32 closes fully against the wheel well 48 in some configurations. As such, the peripheral lip 56 may be configured to physically engage a portion of the undercarriage that immediately surrounds the wheel well 48, in which case the lip could provide an aerodynamic seal around the wheel well. Thus, for example, to close the wheel well 48, the actuator 66 may be configured and programmed to first rotate, and then to axially translate the cover panel 32 into a closed position. Conversely, to uncover and/or to open the wheel well, the actuator 66 would first axially translate the cover door 32 away from physical contact with the undercarriage, and then would rotate the cover door to an open position away from the wheel well opening. Of course, all movements of the cover door 32 would remain within the boundary layer B (FIG. 6).

Although the cover panel 32 has been described as rotating in a first rotational direction for opening, and in a second rotational direction for closing, the structure could also be modified to permit the actuator motor 66 to rotate in a single rotational direction to both open and close the wheel well 48. In all circumstances, the cover panel 32 would physically remain entirely within the boundary layer B. Other modifications may also fall within the spirit and scope of this disclosure.

The present disclosure may also provide for a cover door retrofit kit for an aircraft undercarriage having a wheel well. In such event, each cover door would be customized to cover an existing wheel well having specific dimensions. The kit would provide for the described pivotal rotation of the cover door within an aerodynamic boundary layer of the particular undercarriage for which the kit is being designed. Each cover door retrofit kit would include the described wheel well cover door, a rotary shaft configured to be secured to each cover door at an orthogonal angle to edge portions of the cover door, and an actuator motor configured to pivot the rotary shaft relative to the undercarriage for moving the wheel well cover door generally within a plane defined by the cover door, so that the cover door would remain within the plane while moving to and away from the wheel well opening. Each rotary shaft would be configured to rotate each cover door within the aerodynamic boundary layer of the undercarriage between open and closed positions of the wheel well, as described.

Finally, a method of opening and closing a landing gear wheel well may include configuring a cover door for attachment to the undercarriage of an aircraft, adjacent a wheel well of the aircraft. This may be achieved by affixing a rotary shaft between the undercarriage and the cover door by securing a first end of the rotary shaft to an actuator motor fixed to the undercarriage, and by securing a second end of the rotary shaft to a flanged edge of the cover door. The cover door would then be configured to pivot within a plane defined by the cover door, so that the cover door is confined to movement within the plane, and ideally within an aerodynamic boundary layer of the undercarriage, to open and close the wheel well. The method would then include rotating the cover door by moving the rotary shaft to pivot the cover door about an arc within the plane to open and close the wheel well. The method may also include forming the cover door to have a convex exterior with respect to the undercarriage.

The disclosed embodiment of the cover panels 32, 34 may have other variations and alternative constructions neither described nor suggested herein. For example, for weight control, the cover panels may be formed of extremely lightweight composite materials, instead of standard composite materials and reinforced aluminum used in construction of conventional bulky landing gear doors. Moreover, additional attributes may be included such as emergency mechanisms for opening the cover panels 32, 34 in the event that, for example, an actuator motor 66 were to fail or be rendered inoperable prior to a landing, etc. In addition, although various specific structures, shapes, and components have been described and depicted, numerous other configurations and/or other components may be utilized, and potentially in other environments, as may be appreciated by those skilled in the art.

What is claimed is:

1. A landing gear door rotatably secured to an aircraft undercarriage adjacent a wheel well; the landing gear door comprising:
    a cover panel defining a plane oriented substantially parallel to the aircraft undercarriage, the cover panel configured to close and open the landing gear wheel well;
    wherein movement of the cover panel is substantially limited to rotation of the cover panel within the plane.

2. The landing gear door of claim 1, wherein during flight the undercarriage has an associated aerodynamic boundary layer;
    wherein the plane of the cover panel lies within the aerodynamic boundary layer; and
    wherein the cover panel has an aerodynamic shape and is configured to pivot in a first direction within the aerodynamic boundary layer to open the wheel well, and to pivot in a second direction within the aerodynamic boundary layer to close the wheel well.

3. The landing gear door of claim 1, wherein the cover panel rotates in an arc of least 75° between fully opened and fully closed positions of the wheel well.

4. The landing gear door of claim 1, wherein the aircraft undercarriage comprises a substantially planar surface surrounding the wheel well opening, and wherein the plane of the cover panel is parallel to the surface.

5. The landing gear door of claim 1, wherein the cover panel is a noncircular disc.

6. The landing gear door of claim 1, wherein the cover panel rotates in a single rotational direction to both open and close the wheel well.

7. The landing gear door of claim 1, wherein the cover panel has a peripheral lip.

8. The landing gear door of claim 7, wherein the peripheral lip provides an aerodynamic seal about the wheel well.

9. The landing gear door of claim 1, wherein the cover panel comprises a circular disc.

10. The landing gear door of claim 9, wherein the cover panel is convex with respect to the aircraft undercarriage.

11. The landing gear door of claim 1, wherein rotation of the cover panel is about a single pivot axis on the undercarriage, the pivot axis extending at a substantially orthogonal angle to the plane of the cover panel.

12. The landing gear door of claim 11, further including a rotary shaft configured to rotate about the pivot axis; and
    wherein the cover panel includes a flange pivotally secured via the rotary shaft to the aircraft undercarriage.

13. The landing gear door of claim 12, wherein the rotary shaft extends orthogonally with respect to the cover panel.

14. The landing gear door of claim 12, wherein the flange is integral to the cover panel, and both are formed of a lightweight composite material.

15. A cover door retrofit kit for an aircraft undercarriage having a wheel well, the cover door configured to open and close the wheel well by pivotal rotation within a plane substantially parallel to the aircraft undercarriage; the cover door retrofit kit comprising:
    a substantially planar wheel well cover door; a rotary shaft configured to be secured to the wheel well cover door at a substantially orthogonal angle to an edge portion of the wheel well cover door;
    an actuator motor configured to pivot the rotary shaft relative to the undercarriage for moving the wheel well cover door substantially within a plane defined by the wheel well cover door, such that the cover door is configured to remain within the plane when moving to and away from the wheel well opening;
    wherein the rotary shaft is configured to rotate the cover door between open and closed positions of the wheel well.

16. The cover door retrofit kit of claim 15, wherein the cover door comprises a convex surface.

17. The cover door retrofit kit of claim 15, wherein the cover door includes a pivot flange.

18. The cover door retrofit kit of claim 17, wherein the flange comprises the edge portion.

19. A method of opening and closing a landing gear wheel well in an aircraft undercarriage, including the steps of:
    configuring a cover door for attachment to the aircraft undercarriage adjacent a wheel well of the aircraft;
    affixing a rotary shaft between the undercarriage and the cover door by securing a first end of the rotary shaft to an actuator motor fixed to the undercarriage, and by securing a second end of the rotary shaft to a flanged edge of the cover door;
    configuring the cover door to pivot within a plane defined by the cover door, so that the cover door is confined to movement within a plane parallel to the undercarriage; and
    rotating the cover door by moving the rotary shaft to pivot the cover door about an arc within the plane to open and close the wheel well.

20. The method of claim 19, further including forming the cover door to have a convex exterior with respect to the undercarriage.

\* \* \* \* \*